June 12, 1962 R. J. HARKENRIDER 3,038,201
MULTIPLE TUBE EXTRUSION APPARATUS AND METHOD
Filed Dec. 21, 1955 7 Sheets-Sheet 6
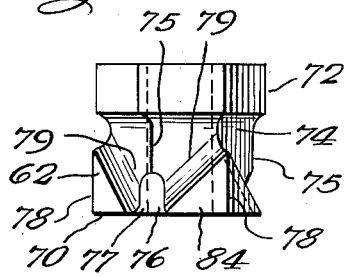
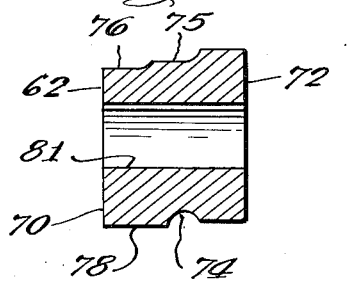
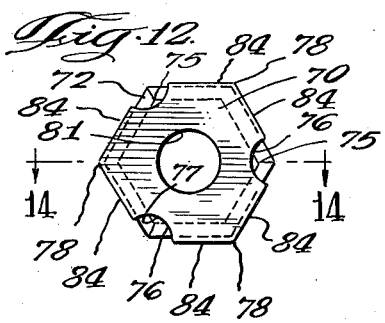
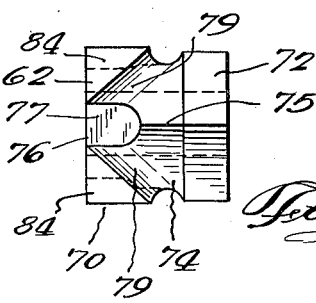
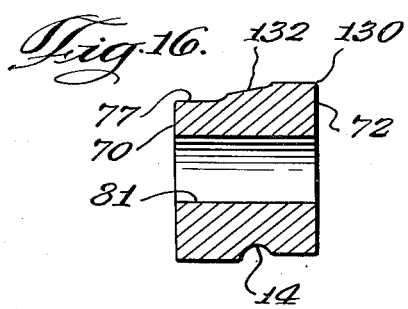
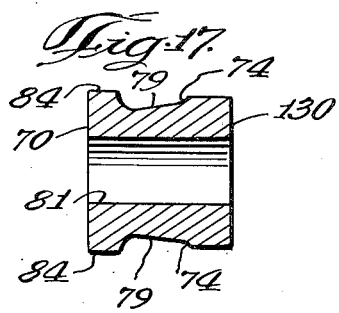
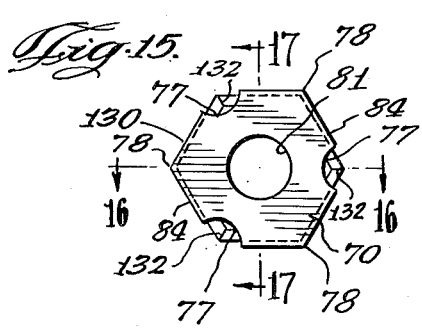
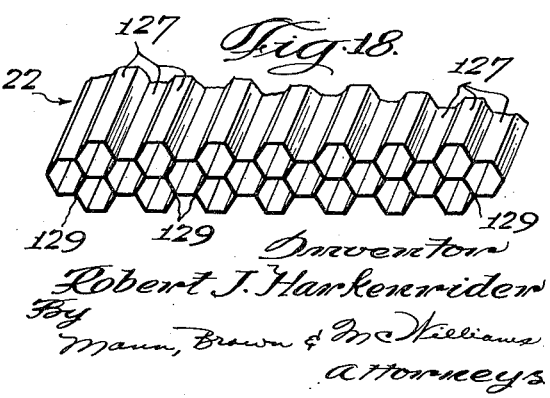
Inventor
Robert J. Harkenrider
By Mann, Brown & McWilliams
Attorneys

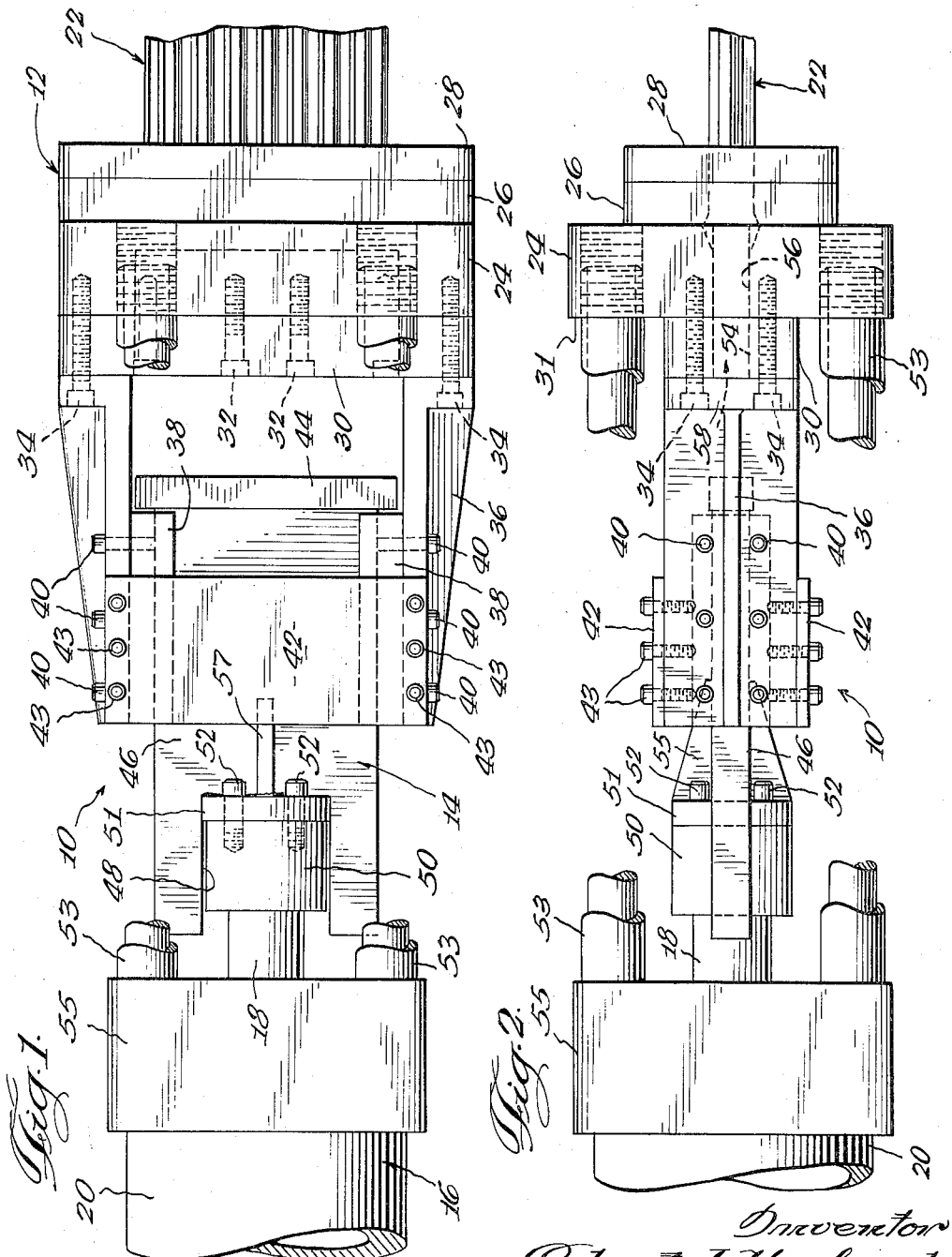

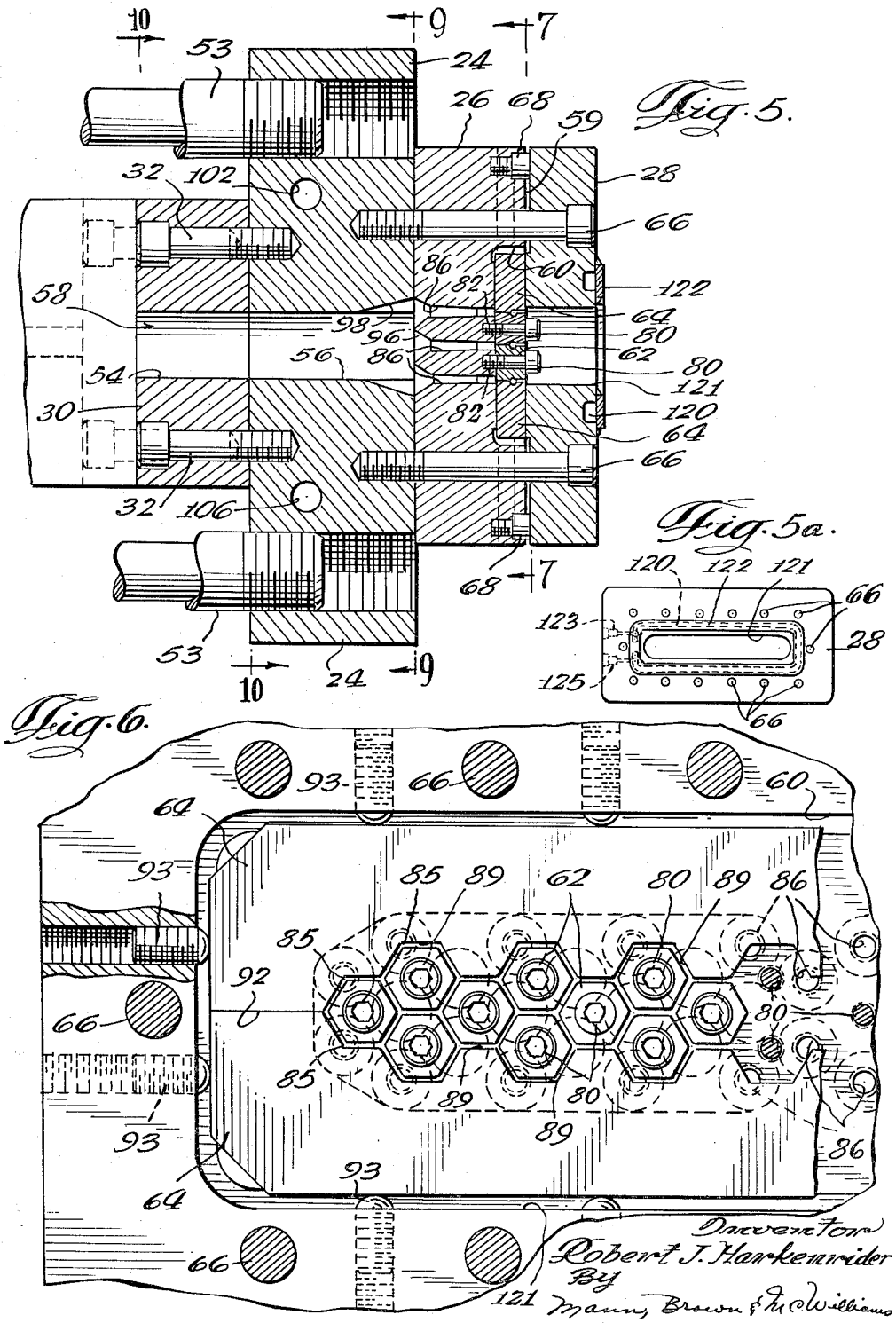

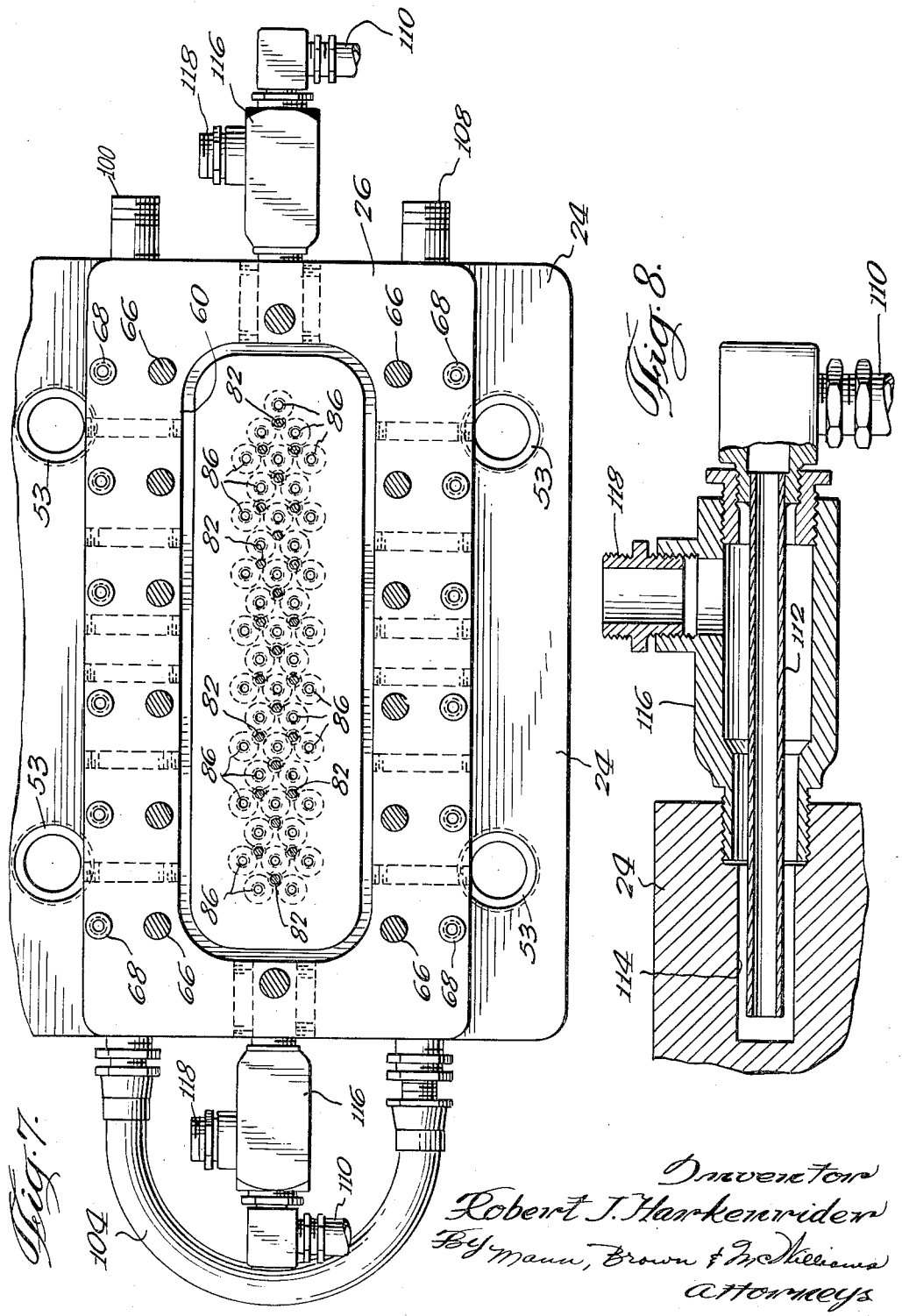

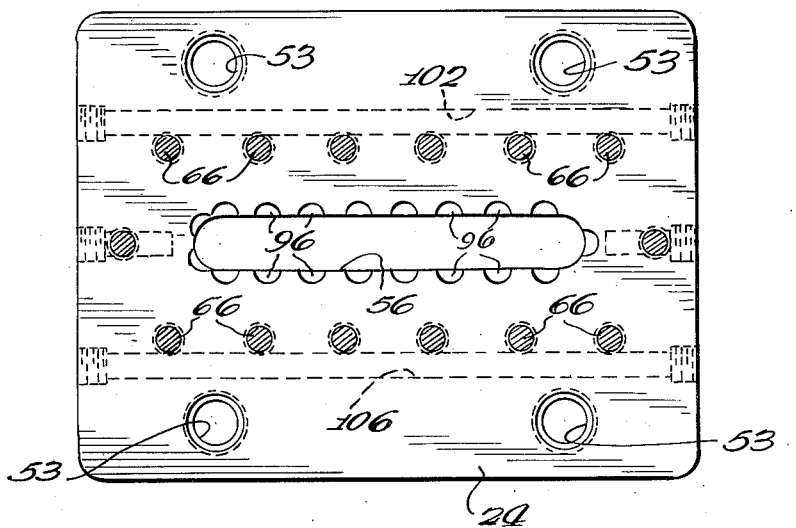
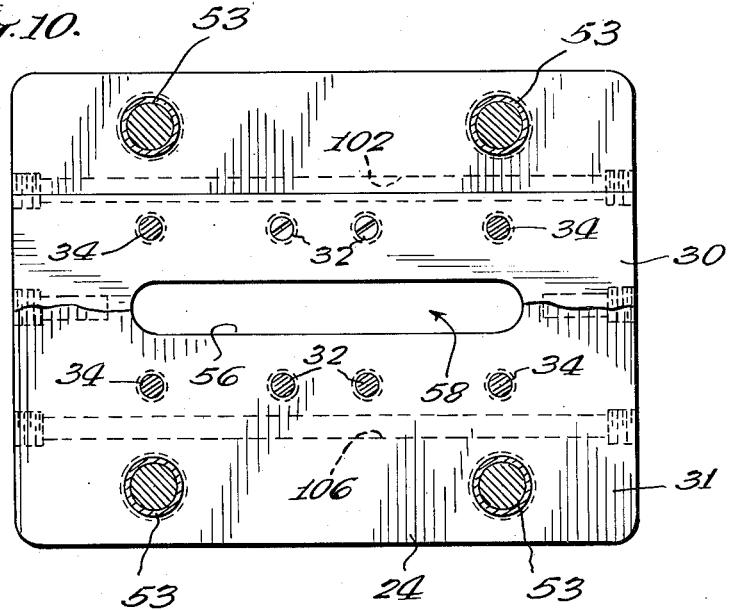

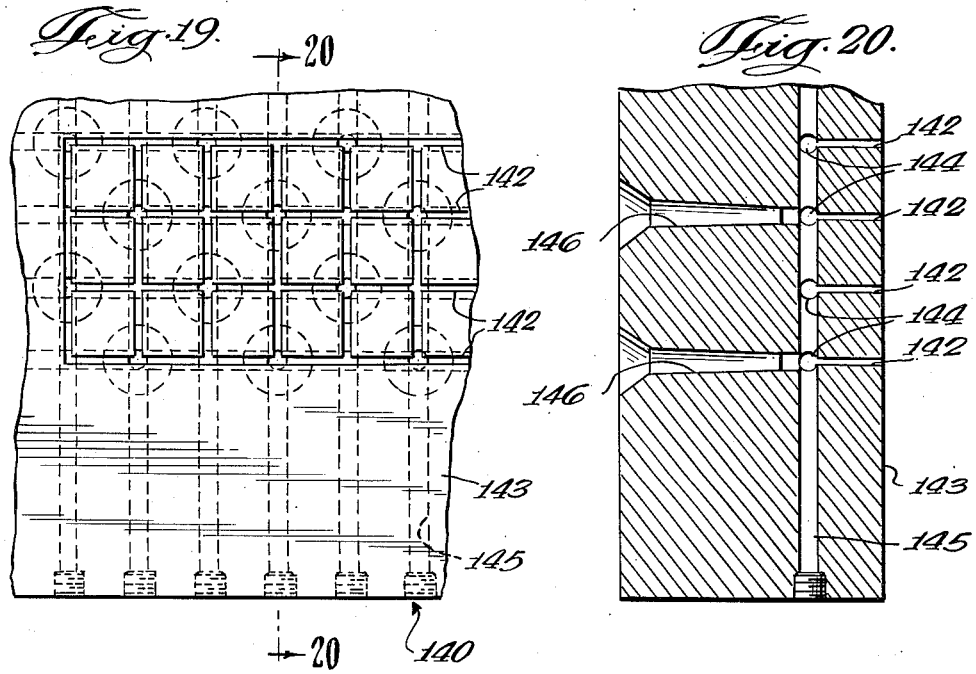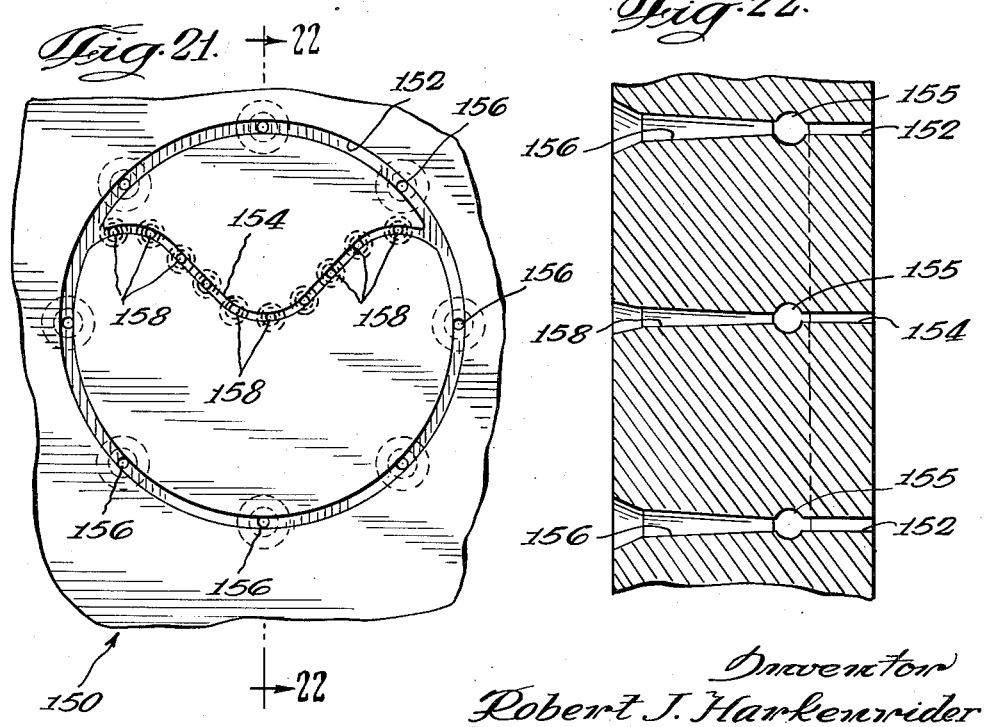

United States Patent Office 3,038,201
Patented June 12, 1962

3,038,201
MULTIPLE TUBE EXTRUSION APPARATUS AND METHOD
Robert J. Harkenrider, Winona, Minn., assignor, by direct and mesne assignments, to Multiple Extrusions, Inc., Winona, Minn., a corporation of Minnesota
Filed Dec. 21, 1955, Ser. No. 554,588
8 Claims. (Cl. 18—14)

My invention relates to apparatus for making multiple tube structures by extrusion, and more particularly, to an apparatus for extruding a product in the form of a plurality of integrally united tubes.

My copending application Serial No. 418,442, filed March 24, 1954, now Patent No. 2,908,037, granted October 13, 1959, of which this application is a continuation-in-part, discloses a method and apparatus for making multiple tube structures by extrusion wherein fluent material is forced simultaneously through a plurality of feed passages into a group of relatively large, looped, distributing passages interconnected throughout the group, and thence through a continuous extruding passage made up of like, generally polygonal, passages having common side portions connected at the corners with adjoining side portions throughout. As disclosed in said application, the die for the apparatus is preferably composed of a group of cores of generally polygonal form and cross section, each including a relatively large base portion and a relatively small head portion with a groove forming a waist between the base and head portions, together with pieces framing the group of cores and having generally semi-polygonal recesses with base and head faces separated by waist forming grooves, all corresponding to the base and head portions of the cores and grooves between them, the cores and margin pieces being held together by fastenings that promote easy assembly and ready taking apart for cleaning and service. The disclosure of my said copending application is hereby incorporated by reference in interests of brevity.

The present application is directed to improvements in and modifications of the invention disclosed in my said copending application.

The principal object of the invention is to provide a method of and apparatus for making multiple tube structures by extrusion wherein the tubular product comprises a plurality of integrally united tubes.

A further object of the invention is to provide a unitary one piece multi-tubular product having integrally united walls of uniform thickness, size and symmetry.

Another object of the invention is to provide extruding apparatus in which the flow of the fluent material through the die is controlled by differential heating of the die.

Still another object of the invention is to provide core elements for a die that are similar in nature to those described in my said copending application, but which provide an improved extruded product.

Yet another object of the invention is to provide an extruding apparatus including a die structure, an extruding material receiving compression chamber adjacent the die structure, and a ram reciprocable in said compression chamber for forcing fluent material through the die structure, wherein the general outlines of the product, the compression chamber and the ram are substantially the same.

Yet a further object of the invention is to provide a single plate extrusion die in which the principles of my invention are employed.

Other objects, uses and advantages will be obvious or become apparent from a consideration of the following description and the drawings.

In the drawings:

FIGURE 1 is a plan view of a practical embodiment of the invention, with parts broken away and a portion of the extruded product shown in plan adjacent the front of the die;

FIGURE 2 is a side elevational view of the apparatus shown in FIGURE 1, with parts broken away;

FIGURE 5 is a view similar to FIGURE 4, but on a smaller scale and showing the entire die structure in section;

FIGURE 5a is a small scale front view of the front retainer plate of the die;

FIGURE 6 is a sectional view along line 6—6 of FIGURE 4, with parts broken away;

FIGURE 7 is a sectional view along line 7—7 of FIGURE 5, with parts shown in elevation and the cores and marginal pieces removed;

FIGURE 8 is a sectional view through the water fitting on the right hand side of FIGURE 7 with parts shown in elevation;

FIGURE 9 is a sectional view along line 9—9 of FIGURE 5;

FIGURE 10 is a sectional view along line 10—10 of FIGURE 5;

FIGURES 11, 12 and 13 are a plan view, a rear elevational view and a side elevational view, respectively, of one of the nesting cores employed in the apparatus shown in FIGURES 1–10;

FIGURE 14 is a cross sectional view along line 14—14 of FIGURE 12;

FIGURE 15 is a rear elevational view of a modified form of nesting core;

FIGURE 16 is a cross sectional view along line 16—16 of FIGURE 15;

FIGURE 17 is a cross sectional view along line 17—17 of FIGURE 15;

FIGURE 18 is a perspective view of one end of the product made by extruding material through the apparatus of FIGURES 1–10;

FIGURE 19 is a front elevational view of a form of single plate die in which the principles of my invention are employed;

FIGURE 20 is a cross sectional view along line 20—20 of FIGURE 19;

FIGURE 21 is a front elevational view of another form of single plate die in which the principles of my invention are employed; and FIGURE 22 is a cross sectional view along line 22—22 of FIGURE 21.

Figure 3:
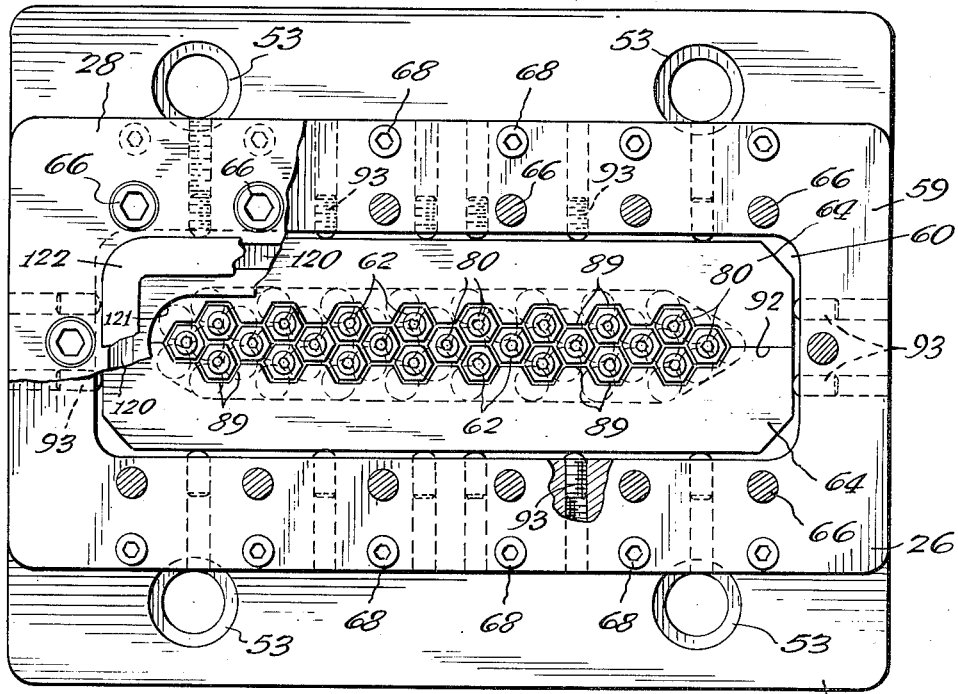
FIGURE 3 is a front elevational view of the apparatus shown in FIGURES 1 and 2, with parts broken away for clarity of illustration.

But these drawings and the corresponding description are for the purposes of illustrative disclosure, and are not intended to impose unnecessary limitations on the claims.

Of the several generally polygonal forms which lend themselves to the application of the invention, the equilateral hexagon is chosen for this preferred embodiment, as it lends itself readily to the construction of the cores and marginal pieces together making up the die including the inlet passages supplying the relatively large, continuous, looped storage and supply passages for the relatively thin tube forming passages to the end that the appropriate suply of fluent material is stored or pooled back of the continuous, generally polygonal tube forming or extrusion passages, and from which storage or pool, where the material is continuously united, it is forced through the final extruding passages as a final continuous product, unitary in all respects.

Reference numeral 10 of FIGURES 1 and 2 generally indicates the illustrated apparatus which includes a die 12, a ram 14 for forcing fluent material through the die and power means 16 for actuating the ram, including a piston rod 18 operable in a fluid cylinder 20 mounted and powered in any suitable manner. Reference numeral 22 of FIGURES 1, 2 and 18 generally indicates the extruded product.

The die 12 generally comprises a main mounting plate 24 defining a body portion and having secured to the front face thereof a distributor plate or screen plate or portion 26 on which the individual cores and marginal pieces are mounted and a front retainer plate 28. A supplementary mounting plate 30 is secured to the rear face 31 of plate 24 by bolts 32 and bolts 34, the latter of which also secure the angled slide supports 36 to the plate 30. A channel-shaped slide element 38 is secured to each support 36 by bolts 40, and the ram 14 is slidably mounted in these elements 38. Tie plates 42 fixed to the ends of supports 36 by bolts 43 securely space these elements from each other and properly position them with respect to the ram 14.

The ram 14 comprises a ram head 44 fixed to the front end of a flat bar 46 that is slotted at 48 to receive an adapter 50. The adapter 50, which is secured to the end of piston rod 18, is fixed to the bar 46 by bolts 52 secured to plate 51 welded to bar 46. Suitable tie rods 53 extend between plate 24 and a bracket 55 fixed to the end of cylinder 20. A web 57 may be fixed between the bar 46 and plate 51 for strengthening purposes.

The main mounting plate 24 and the supplementary mounting plate 30 are formed with openings 54 and 56 (see FIGURES 2, 5, 9 and 10), which define a pot or compression chamber 58 into which the material to be extruded is forced by the ram head against the screen plate 26. The general outline of the ram head 44 and the compression chamber 58 preferably is substantially the same as the outline of the foraminous area of the screen plate and the product being extruded.

The front face 59 of the screen plate 26 of the illustrated embodiment is provided with a recessed portion 60 adjacent the center thereof, and the individual cores 62 and marginal pieces 64 are mounted in this recessed portion, with the front retainer plate 28, which is fixed to the main plate 24 by bolts 66, bearing against the marginal pieces 64 and the screw threaded studs or spacers 68 mounted in the front face 59 of screen plate 26.

Referring to FIGURES 11–14, the individual cores each comprise a relatively large base portion 70 and a relatively small head portion 72 separated from the head portion by a groove 74 in each face of the core defining a waist portion therein. The cores of the illustrated embodiment are provided with a hexagon configuration, and alternate corners of the base portion are cut away to form feed grooves 76 leading to the waist grooves 74, and diverging toward the head portion 72 as well as the other alternate corners 78. Feed grooves 76 include rounded portions 77 leading into the relatively flat portions 79 that merge into the waist grooves 74.

The individual cores are secured to the screen plate 26 by bolts 80 extending through holes 81 in the respective cores and mounted in holes 82 formed in the screen plate. When the cores are mounted in place, the faces 84 of the base portions 70 of the respective cores contact adjacent cores to define feed passages 85 that receive fluent material from a passage 86 (see FIGURES 4 and 5) formed in the screen plate and deliver it to the pooling chambers 88 defined by adjacent waist grooves 74. The fluent matter passes from the pooling chambers into the extruding passages 89 defined by the relatively small head portions of the cores.

As shown in FIGURES 3 and 6, the illustrated arrangement includes two marginal pieces 64 abutting each other at 92 and having complementary faces or corners receiving the outer ones of the group of cores and having base portions, head portions and waist grooves corresponding to the relatively large base portions 70, the relatively small head portions 72 and the waist grooves 74 of the individual cores 62. The marginal pieces are secured adjacent the cores by set screws 93 mounted in the screen plate 26.

As described in said copending application, the base portions of the illustrated cores 62 (twenty-five in number) and the two marginal pieces 64 nest together closely and mutually register and locate the cores and marginal pieces with respect to each other. It will be seen that the cores and marginal pieces form interconnected pooling areas or chambers 88 and interconnected extruding passages 89. The fluent material on entering the interconnected pooling chambers is provided with a hexagonal configuration before it enters the extruding passages 89 that outline the walls of the tubes.

In the illustrated embodiment, three feed passages 86 are provided in the screen plate 26 about each core 62 which lead to the waist grooves that define the interconnected pooling chambers which comprise the hexagonal pooling area of the die. The mouths of these passages 86 may be tapered as at 96 and aligned with the curved grooves 98 formed in the front face of the main plate 24 (see FIGURES 4, 5 and 9).

It will be apparent that the die can be readily taken apart and put together; that when assembled, the natural form of the bases of the cores and marginal pieces insures the proper relationship, and the general binding of the group of cores and marginal pieces is such as to maintain the necessary relation for uniform production of the walls of the cellular or multi-tubular structure.

The main plate 24 and the front retainer plate 28 of the illustrated embodiment are heated by hot water passed through passages formed in them about the compression chamber 58 and core structure respectively. As shown in FIGURE 7, the top and bottom of the main plate 24 is heated by water entering as, for instance, through pipe end 100 secured to the plate, and passing through an upper generally horizontal passage 102 (see FIGURES 9 and 10) through a conduit 104 into the lower generally horizontal passage 106 (see FIGURES 9 and 10) and out of the pipe end 108 into a suitable conduit. The sides of the plate 24 are heated by water passing from a conduit 110 into the tube 112 (see FIGURE 8) and thence to a recess 114 formed in the side of the plate. From the recess 114 the water passes into the fitting 116 and thence outwardly of the connector 118 to a suitable conduit.

The front retainer plate 28 is heated by water passing into a passage 120 (see FIGURES 4 and 5) formed in the front face of the plate 28 by milling a groove therein about the opening 121 formed in this plate and welding the looped metal element 122 thereover. Water enters plate 28 through a passage 123 (see FIGURE 5a) and leaves the passage 120 through passage 125, appropriate conduits being connected to the passages 123 and 125.

The screen plate 26 is heated by conduction from the main plate 24 while the marginal pieces are heated by conduction from the front retainer plate 28. As mentioned hereinbefore, the front retainer plate is spaced somewhat from the screen plate to prevent any substantial heat transfer by conduction to the screen plate. It will be appreciated that the relative small studs will not transfer much heat by conduction. The opening 121 in plate 28, incidentally, has the same general outline as chamber 58.

Figure 4:
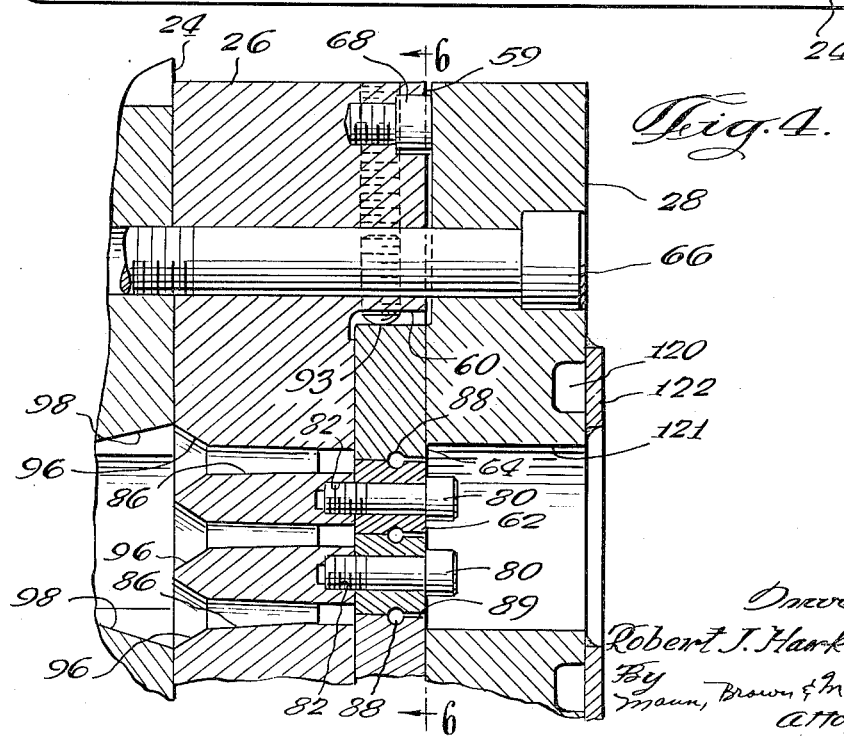
FIGURE 4 is an enlarged sectional view through the front portion of the die.

It will be noted from FIGURE 4 that the passage 120 formed in the front retainer plate is opposite the marginal pieces, so that the portion of the retainer plate in contact with the marginal pieces receives much of the heat dissipated from the passage 120. The passage 120 can be made relatively deep, and, of course, the closer it approaches the marginal pieces, the closer the temperature of the marginal pieces can be controlled.

I have found that by controlling the temperature of the water entering the main plate 24 and the front retainer plate 28, a more uniform and symmetrical product will be formed. Experience has shown that the fluent material will not always pass from all portions of the extruding area at the same rate. For instance, it frequently happens that the fluent material emerging along the outside or border of the extruding area formed by the interconnected extruding passages will come out faster than that emerging at the center of the extruding area. I have found that wrinkles form on the outside walls of the product when this is happening. By admitting somewhat cooler water to the passage 120, the wrinkles cease, and then one can be sure that the fluent material is emerging from all portions of the extruding area at the same rate which provides the desired uniform and symmetrical product.

Sometimes it happens that the fluent material emerging along the outside or border of the extruding area from the interconnected extruding passages will come out slower than that emerging at the center of the extruding area. In this case, I have observed that wrinkles form on the inner walls of the product. By admitting somewhat warmer water to the passage 120, fluent material along the outside of the extruding area comes out faster, and the wrinkles cease.

This control can also be modified by controlling the temperature of the water entering the passages and recesses formed in the main plate 24. Thus, the fluent material at the top and bottom or along the respective sides of the compression chamber can be made to flow faster or slower into the screen plate as is necessary to provide a uniform product.

The generally hexagonal cores are readily made from commercial bar stock reduced to form the head, shaped to form the various grooves, ground on the faces of the bases, and hardened to insure accuracy and long wear.

The material extruded may be the rubber-like compound mentioned in my said copending application, an illustrative formula or recipe for which is as follows:

|  | Parts | Made by— |
| --- | --- | --- |
| Hycar 1043 | 100.0 | B. F. Goodrich Chemical Co. |
| Zinc Oxide (#42 Green Label) | 5.0 | St. Joseph Lead Co. |
| Sulfur (Spider or Blackbird) | 0.5 | C. P. Hall Co. |
| FEF Black (Philblack A) | 100.0 | Phillips Petroleum Co. |
| GP-261 | 10.0 | B.F.Goodrich Chemical Co. |
| TMTD (Methyl Tuads) | 2.0 | R. T. Vanderbilt Co. |
| Santocure | 1.0 | Monsanto Chemical Co. |
| Stearic Acid | 1.0 | Binney & Smith Co. |

Hycar 1043 is a copolymer of butadiene and acrylonitrile (medium acrylonitrile type). Philblack A is fast extrusion furnace carbon black. GP-261 is dioctyl phthalate. Methyl Tuads are tetramethyl thiuram disulfide. Sanctocure is N-cyclohexyl-2-benzothiazole sulfenamide.

When the multi-tube structures according to the invention are to be used for cushions and similar structures not exposed to oil, rubber of the usual composition will be satisfactory. When the multi-tube structures are for building or insulating, the fluent composition will be selected from the customary asphaltic and bituminous base, gypsum, and other earth. The illustrated product is particularly adapted for us as a resilient core in journal box packings.

The hexagonal multiple tube structure illustrated in FIGURE 18 is preferred because it presents extraordinary ability to resist pressure and to recover after being relieved, but there are uses in which other shapes will be satisfactory or preferred. The product 22 is composed of a stack of like parallel tubes 127 in which each tube has wall portions in common with other tubes 127 and integral with them at adjoining corners 129. The extruded cellular product is entirely integral and the distribution of material provides an extremely light, springy element with a strong resistance to deforming under pressure and a high recovery upon release, even after being compressed for a long time under adverse temperature conditions.

The size of the openings or feed passages 86 in the screen plate and the size of those feed passages 85 provided by the feed grooves 76 formed in the cores and marginal pieces should be proportioned to the amount of material required in the particular section of the extrusion area to which the respective openings or passages feed. In the apparatus of FIGURES 1–10, these feed passages and feed grooves are all the same size since the extrusion passages are all of the same thickness.

FIGURES 15–17 illustrate a modified form of core 130 wherein the ridge 132 extending from the end of the rounded portion 77 of the feed groove 76 tapers outwardly in the direction of the head portion 72 rather than extends parallel to the axis of the core, as in the embodiment of FIGURES 11–14 (see ridge 75). In this form of the invention, the surfaces of the adjacent waist grooves 74 and feed grooves 76 of each core 130 also taper radially inwardly in the direction of the alternate corners 78 of the core (which are not cut out on the base portion 70). Thus, the transversely diverging portions of feed passages 85 provided when the cores 130 are secured to the screen plate 26 converge along their central axes in the direction of the head portions 72 and diverge toward the alternate corners 78 and away from ridges 132.

The reason for this arrangement is that the fluent material as it leaves the feed passages 85 formed by the cores 62 tends to move straight ahead toward the extruding passages formed by the head portions 72 of the cores, with the result that at times the portions of the product formed adjacent the corners 78 spaced from the feed passages are too thin. This can be corrected by proper temperature control, but the cores 130 are an alternate solution. The modified core 130 provides feed passages that restrict the amount of fluent material moving straight ahead and increase the amount of fluent material that should move toward corners 78. The marginal pieces used with cores 130 should, of course, be modified to complement the changed shape of these cores.

The operation of the apparatus 10 will be obvious from the above description. The material to be extruded is inserted into the compression chamber or pot 58 when the ram 14 is in the position shown in FIGURE 1, and thereupon the power means 16 is actuated to force this material against the screen plate 26. Before starting, the water should be turned on to the main plate 24 and the front retainer plate 28 to heat the die structure to the desired temperature. As pressure is applied to the material being extruded in the presence of this heat, it will become plasticized and will pass through the passages 86 in the screen plate 26 and those formed by the cores and marginal pieces, into the interconnected pooling areas, and thence to the interconnected extruding passages. In the illustrated embodiment, the extrusion process must be halted periodically so that the compression chamber can be refilled with material to be extruded. I contemplate, however, that the die structure comprising my invention may be applied to apparatus that will provide continuous extrusion, such as, for instance, screw type extruders.

FIGURES 19 and 20 illustrate the principles of my invention applied to a single plate die 140. As shown in these figures, the interconnected extrusion passage 142 may be formed by milling the front surface 143 of the die plate 140 with conventional apparatus. The interconnected pooling areas 144 may be formed by drilling through the die plate where shown at 145 by conventional apparatus. Suitable plugs may be employed to block as much of holes 145 as are not necessary to form the extruded product. The feed passages 146, proportioned in size to the amount of material required by the portion of the extruding area to which they lead, may be formed by drilling from the rear or back side of the plate 140 in a conventional manner. The die plate 140 may then be substituted for the screen plate, cores and marginal pieces of the embodiments of FIGURES 1–17. This form of the invention eliminates the necessity of forming the relatively complicated cores of the earlier described embodiment.

The embodiment shown in FIGURES 19 and 20 will form a tubular product in which the tubes have a square configuration. It will be obvious, however, that other polygonal forms may be made by appropriately forming the die plate in accordance with the teachings of my invention. Moreover, a single tube may be extruded by shaping the die plate in this manner to provide an extruding passage that will define a single tube. The tube may be formed in any desired shape, for instance, the hexogonal configuration of FIGURES 1–18 or the square configuration of FIGURES 19 and 20. Of course, single tubes may be extruded by employing a core 62 or 130 secured to an appropriately formed die plate.

FIGURES 21 and 22 illustrate a modified form of single plate die 150 in which the relatively large extrusion passage 152, the relatively small extrusion passage 154, and the pooling areas 155 are formed in the die face by conventional manufacturing operations. The feed passages 156 to the extruding passage 152 and the feed passages 158 to the extruding passage 154 are proportioned in size and distribution to the amount of material required by the extrusion passages to which they lead, as shown in FIGURE 21. The passages 156 are relatively large and are spaced relatively far apart, while the feed passages 158 are relatively small and are spaced relatively close together. This provides even distribution of the material being extruded in the respective extrusion passages. Of course, passages 152 and 154 are of sufficient depth to permit the material being extruded through the die plate to coalesce into the configuration defined by the extruding passages.

The foregoing description and the drawings are given merely to explain and illustrate my invention, and the manner in which it may be performed, and the invention it not to be limited thereto, except insofar as the appended claims are so limited since those skilled in the art who have my disclosure before them will be able to make modifications and variations therein without departing from the scope of the invention.

I claim:

1. A die for extruding multiple tube structures having integrally united walls comprising a group of cores of generally polygonal cross section having an even number of sides forming faces, each of said cores including a relatively large base portion and a relatively small head portion separated by a reduced waist portion, said head and base portions of said cores having said polygonal cross section with alternate corners of said base portions of each of said cores being excised to form feed grooves that diverge in size in the direction of said waist portions, said cores being positioned with the faces of the base portions thereof in contact, whereby the faces of said head portions define interconnected extruding passages, said waist portions define an interconnected pooling area, and the feed grooves at said alternate corners of said cores define feed passages leading to and diverging in the direction of said pooling area.

2. The die set forth in claim 1 wherein said cores are so formed that the radial cross sectional area of said feed passages converges along said alternate corners of each core in the direction of said pooling area.

3. The die set forth in claim 2 including marginal pieces having generally semi-polygonal faces mating the adjacent faces of the cores as adjacent faces of the cores in the group mate each other.

4. A one piece die plate for extruding multiple tube structures comprising a plate having a plurality of grooves milled in one face thereof which define interconnected polygonal extruding passages, and a plurality of feed passages leading from the other face thereof to said extruding passages, said feed passages being distributed in proportion to the width of the respective extruding passages and said grooves being of a depth to permit the material being extruded through said die plate to coalesce into the configuration defined by said extruding passages prior to leaving said die plate.

5. In a die for extruding multiple tube structures and including a body portion defining a compression chamber having an inlet for receiving the material to be extruded, a screen portion extending transversely across said compression chamber, a plurality of cores affixed to the downstream side of the screen portion, said cores defining a plurality of interconnected extrusion passages that form the multiple tube structure and said screen portion being formed with a plurality of feed passages in communication with said extrusion passages, the improvement wherein a heat conducting member is positioned in thermal contact with the cores defining the rim of the multiple tube structure, and including means for selectively heating said heat conducting member, said heat conducting member being substantially thermally isolated from said screen portion, whereby the rate of extrusion of the material defining the rim of the structure with respect to the extrusion rate of the remainder of the material being extruded may be varied by varying the temperature of the rim defining cores.

6. In a die for extruding multiple tube structures and including a body portion defining a compression chamber having an inlet for receiving the material to be extruded, a screen portion extending transversely across said compression chamber, a group of cores affixed to the downstream side of the screen portion, said cores being generally polygonal in configuration and each including a base portion, a reduced waist portion, and a head portion, the base portions of the cores being of interfitting polygonal configuration and mounted on the downstream side of the screen portion in abutting relation, the head portions of the cores being also of polygonal configuration and proportioned to provide between them interconnected extruding passages that define the walls of the multiple tube structure, said screen portion and said cores being formed with communicating feed passages that feed the material being extruded to said extruding passages, the improvement wherein a heat conducting member is positioned in thermal contact with the border cores of the group of cores, and including means for selectively heating said heat conducting member, said heat conducting member being substantially thermally isolated from said screen portion, whereby the rate of extrusion of the material through the extrusion passages defined by the border cores may be varied with respect to the extrusion rate of the material being extruded through the other extrusion passages, by varying the temperature of the rim defining cores.

7. The improvement set forth in claim 6 wherein said heat conducting member abuts against marginal members surrounding said cores and made fast against the border cores, said heat conducting member being made fast against said marginal members, said heat conducting member being formed with conduit means extending generally transversely of the direction of flow of the extruded material and aligned with said marginal members longitudinally of the direction of flow of the extruded material, and means for supplying a thermally controlled fluid to said conduit means.

8. In a die for extruding multiple tube structures and including a body portion defining a compression chamber having an inlet for receiving the material to be extruded, a screen portion extending transversely across said compression chamber, a group of cores affixed to the downstream side of the screen portion, said cores being generally polygonal in configuration and each including a base portion, a reduced waist portion and a head portion, the base portions of the cores being of interfitting polygonal configuration and mounted on the downstream side of the screen portion in abutting relation, the head portions of the cores being also of polygonal configuration and proportioned to provide between them interconnected extruding passages that define the walls of the multiple tube structure, said screen portion and said cores being formed with communicating feed passages that feed the material being extruded to said extruding passages, the improvement wherein a heat conducting member is positioned in thermal contact with the border cores of the group of cores and including means for selectively heating said heat conducting member, said heat conducting member being substantially thermally isolated from said screen portion, and wherein said body portion is formed with conduit means above and below said compression chamber, and on either side thereof, and means for supplying thermally controlled fluids to said respective conduit means, whereby the rate of the extrusion through the extruding passages may be made uniform across the transverse cross section of the multiple tube structure formed thereby by varying the temperatures of said cores and said body portion about the material being extruded.

References Cited in the file of this patent

UNITED STATES PATENTS

| | | |
|---|---|---|
| 993,970 | Droitcour | May 30, 1911 |
| 1,152,978 | Royle | Sept. 7, 1915 |
| 1,228,495 | Tanzi | June 5, 1917 |
| 1,800,180 | Day | Apr. 7, 1931 |
| 1,906,744 | Frandsen | May 2, 1933 |
| 2,143,549 | Edmonds | Jan. 10, 1939 |
| 2,168,889 | Thomas | Aug. 8, 1939 |
| 2,178,431 | Orr | Oct. 31, 1939 |
| 2,307,034 | Gaenzle | Jan. 5, 1943 |
| 2,366,417 | MacMillin | Jan. 2, 1945 |
| 2,392,190 | Ritter | Jan. 1, 1946 |
| 2,477,852 | Bacon | Aug. 2, 1949 |
| 2,508,988 | Bradley | May 23, 1950 |
| 2,514,886 | McDearmon | July 11, 1950 |
| 2,597,638 | Higbie | May 20, 1952 |
| 2,600,686 | Piperoux et al. | June 17, 1952 |
| 2,654,686 | Hanson | Oct. 6, 1953 |
| 2,697,852 | Bailey | Dec. 28, 1954 |
| 2,820,249 | Colombo | Jan. 21, 1958 |

FOREIGN PATENTS

| | | |
|---|---|---|
| 263,350 | Switzerland | Nov. 16, 1949 |
| 761,481 | Germany | Nov. 8, 1951 |